US009513386B2

(12) United States Patent
Coelho Dos Santos Varela et al.

(10) Patent No.: US 9,513,386 B2
(45) Date of Patent: Dec. 6, 2016

(54) READING DEVICE AND METHOD FOR MEASURING ENERGY AND FLIGHT TIME USING SILICON PHOTOMULTIPLIERS

(71) Applicants: PETSYS—MEDICAL PET IMAGING SYSTEMS, S.A., Oeiras (PT); Manuel Dionísio Da Rocha Rolo, Lisbon (PT); Ricardo Alexandre Marques Bogalho, Lisbon (PT)

(72) Inventors: Joáo Manuel Coelho Dos Santos Varela, Lisbon (PT); Angelo Rivetti, Turin (IT); Manuel Dionísio Da Rocha Rolo, Lisbon (PT); Ricardo Alexandre Marques Bogalho, Lisbon (PT)

(73) Assignee: PETSYS—MEDICAL PET IMAGING SYSTEMS, S.A., Oeiras (PT)

( * ) Notice: Subject to any disclaimer, the term of this patent is extended or adjusted under 35 U.S.C. 154(b) by 0 days.

(21) Appl. No.: 14/443,659

(22) PCT Filed: Nov. 18, 2013

(86) PCT No.: PCT/PT2013/000067
§ 371 (c)(1),
(2) Date: May 19, 2015

(87) PCT Pub. No.: WO2014/077717
PCT Pub. Date: May 22, 2014

(65) Prior Publication Data
US 2015/0309192 A1 Oct. 29, 2015

(30) Foreign Application Priority Data
Nov. 19, 2012 (PT) .......................... 106650

(51) Int. Cl.
G01T 1/24 (2006.01)
G01T 1/29 (2006.01)

(52) U.S. Cl.
CPC ............... *G01T 1/248* (2013.01); *G01T 1/249* (2013.01); *G01T 1/2985* (2013.01)

(58) Field of Classification Search
CPC ........ G01T 1/2985; G01T 1/248; G01T 1/249; G01T 1/208; G01T 1/247; G01T 1/2928
(Continued)

(56) References Cited

U.S. PATENT DOCUMENTS 8,164,063 B2 * 4/2012 Frach .................... G01T 1/2985
250/363.04
8,395,127 B1 * 3/2013 Frach .................... G01T 1/2018
250/370.08
(Continued)

OTHER PUBLICATIONS

Author: Luis B. Oliveira et al., Title: Noise Performance of a Regulated Cascode Transimpedance Amplifier for Radiation Detectors, Date: Sep. 2012, Publisher: IEEE Transactions on Circuits and Systems.*
(Continued)

Primary Examiner — David J Makiya
Assistant Examiner — Taeho Jo
(74) Attorney, Agent, or Firm — Mark M. Friedman

(57) ABSTRACT

This invention is about a readout apparatus and method for time-of-flight and energy measurements with silicon photomultipliers (SIPM) coupled to a scintillator. The timing measurement can be as accurate as 50 ps or below, after calibration. The energy is measured using a time-over-threshold technique, and the energy resolution is only constrained by the scintillation statistics. In order to achieve low power of 10 mW per channel, a low impedance input amplifier and analog time-to-digital converters (TDCs) based on time interpolation are used. The readout circuit can
(Continued)

Figure 1:
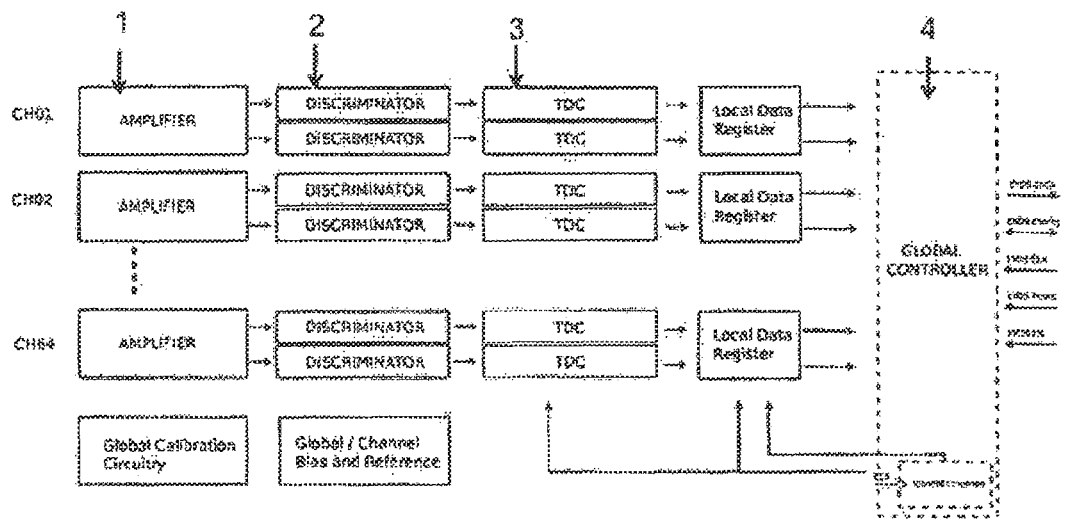

be triggered by a single photoelectron (p.e.) with a signal-to-noise ratio (SNR) above 20 dB. The said readout circuit operates with SiPMs of different gain, polarity and matrix size. The preferred embodiment of the readout apparatus is a multi-channel application specific integrated circuit (ASIC) with 64 channels.

12 Claims, 2 Drawing Sheets

(58) Field of Classification Search
USPC .................................................. 250/370.06
See application file for complete search history.

(56) References Cited

U.S. PATENT DOCUMENTS

| | | | | |
|---|---|---|---|---|
| 8,884,240 B1* | 11/2014 | Shah | ............... | G01R 33/481 250/363.05 |
| 8,969,814 B2* | 3/2015 | Henseler | ............... | G01T 1/248 250/362 |
| 9,244,179 B2* | 1/2016 | Lau | ............... | G01T 1/2006 |
| 2008/0203309 A1* | 8/2008 | Frach | ............... | G01T 1/1642 250/362 |
| 2010/0316184 A1* | 12/2010 | Iwanczyk | ............... | A61B 6/032 378/19 |
| 2011/0001053 A1* | 1/2011 | Solf | ............... | G01T 1/249 250/370.08 |
| 2011/0079727 A1* | 4/2011 | Prescher | ............... | G01T 1/2928 250/370.1 |
| 2011/0147567 A1* | 6/2011 | Grazioso | ............... | H01L 27/14609 250/208.1 |
| 2011/0220802 A1* | 9/2011 | Frisch | ............... | G01T 1/208 250/363.03 |
| 2012/0212355 A1* | 8/2012 | Zhang | ............... | G01T 1/2018 341/50 |
| 2015/0069250 A1* | 3/2015 | Schmand | ............... | G01T 1/2018 250/362 |
| 2015/0285921 A1* | 10/2015 | Shah | ............... | G01R 33/481 600/411 |
| 2015/0309192 A1* | 10/2015 | Coelho Dos Santos Varela | ....... | G01T 1/248 250/370.06 |

OTHER PUBLICATIONS

Author: Manuel D Rolo et al., Title: A 64-channel ASIC for TOFPET applications , Date: Oct. 31, 2012, Publisher: IEEE NSS 2012 N16-4.*

Author: Peter Fischer et al., Title: Multi-Channel Readout ASIC for ToF-PET, Date: 2006, Publisher: 2006 IEEE Nuclear Science Symposium Conference Record.*

Author: H. Matsuda et al., Title: Development ofultra-fastASICforfuturePETscannersusingTOF-capable MPPC detectors, Date: Jun. 1, 2012, Publisher: SciVerse ScienceDirect.*

Author: N. Marinoet al., TitleAn innovative detection module concept for PET, Date: Aug. 21, 2012, Publisher: IOP Publishing for Sissa Medialab.*

* cited by examiner

US 9,513,386 B2

READING DEVICE AND METHOD FOR MEASURING ENERGY AND FLIGHT TIME USING SILICON PHOTOMULTIPLIERS

BACKGROUND OF THE INVENTION

Time-of-flight information on PET systems (TOFPET) allows for unprecedented sensitivity, as the signal-to-noise ratio and thus the background rejection are very much improved. The very high gain of the silicon multiplier (SiPM) and its sensitivity to single photon hits makes it a good candidate for highly compact systems. A timing resolution of 200 ps is enough to confine the event origin with a FWHM position uncertainty of 30 mm along the line-of-response (LOR). Achieving this fine resolution calls for fast front-end electronics, capable of extracting a very precise time stamp of each event. Scintillation light statistics, which include intrinsic timing characteristics of the crystal and the travel path of the photons, along with the time drift inherent to the e-h pair generation of the SIPM, may become a source of jitter that could ultimately compromise the targeted time resolution. In fact, the signal shape fluctuation at the output of the photodetector reflects the statistical time distribution of each photon building up the signal. Since the arrival time of these photons is weakly correlated to the time of the electron-positron annihilation, the readout system must be able to trigger on the first photo-electron. This ability requires low-noise front-end electronics with enough bandwidth such that the time walk across the dynamic range becomes negligible.

On the other hand, the design of compact PET detectors poses strict limits on power consumption. This constraint has motivated the choice of a low-power input stage and a very low-power analogue time-to-digital converter with a time binning of 50 ps.

BRIEF FIGURE DESCRIPTION

The following description is based on the attached figures where, without any constraint, it is represented:

In FIG. 1 the readout architecture in a multi-channel system, including in each channel amplification circuits (1) and discriminators (2) of the input signal; two Time-to-Digital Converter (TDC) based on analog time interpolation (3); a global controller of the readout of the time and energy digital data stored in each channel (4).

Figure 2:
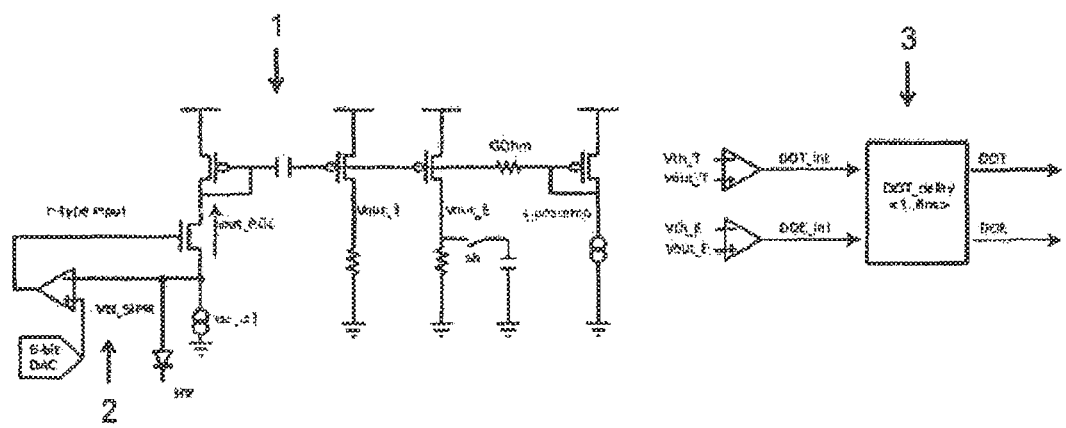
Figure 3:
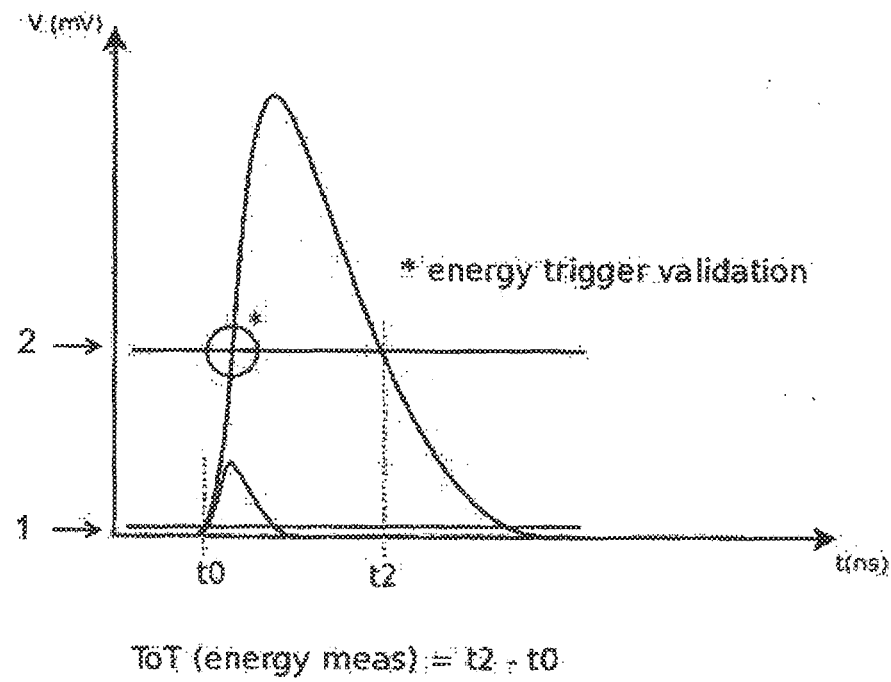

In FIG. 2 the architecture of the amplification and discrimination of the input signal, including differential amplifiers of low impedance using a regulated gate cascade (1), with adjustable baseline of the input node (2) and a delay line at the low-threshold discriminator output (3). In FIG. 3 the concept of a dual-threshold readout where a very low threshold (1) triggering on the first photoelectron is used to measure the time, and a higher threshold (2) is used to validate or reject the input pulse, and where the energy of the input pulse is extracted from the time difference between the two time tags, obtained with the first threshold in the rising edge of the pulse (t0) and with the second threshold in the falling edge of the pulse (t2).

Figure 4:
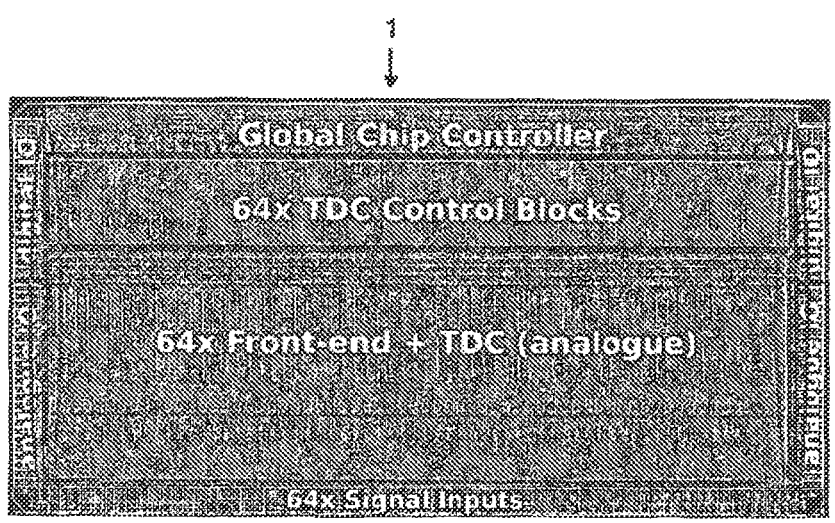

In FIG. 4 the preferred embodiment of the described readout method in a 64-channel ASIC, polarization and calibration blocks, and a global controller, where one edge (1) is free of pins, such that a twin chip rotated by 180° can be abutted to form a compact circuit with 128 channels.

INVENTION SUMMARY

The readout apparatus for time-of-flight and energy measurements which forms this invention and which provides accurate time-of-flight information when used in PET systems with fast crystals (e.g. LYSO), which allow to confine the origin of the two 511 keV photons with a position uncertainty of 30 mm along the line-of-response (LOR), essentially includes:

a silicon photomultiplier (SiPM) per channel;

front-end amplification and discrimination circuits and two analogue time-to-digital converters (TDCs) based on time interpolation, per channel, as shown in FIG. 1, where the said input front-end circuits and TDCs have power consumption smaller than 10 mW per channel, for use in Time-of-Flight (ToF) Positron Emission Tomography (PET) systems;

where the said front-end amplifier circuits represented in FIG. 2 are low impedance input differential amplifiers built-up by a regulated-gate cascode circuit with low-noise and high bandwidth, and with the ability to fine tune the DC node voltage at the input;

a dual-threshold mechanism based on two independent branches with discriminator trigger thresholds that can be set separately, such that a very low threshold generates a trigger on the first photo-electron, which is used for time measurement, and a higher threshold is used to validate or to discard the input pulse.

Said apparatus also comprises:

a delay line on the output of the low-threshold discriminator, long enough to wait for the signal of the high-threshold, represented in FIG. 2, four time-to-amplitude converters (TAO), one analog to digital convertor (ADC) and associated multi-buffering First-In-First-Out (FIFO) for each of the two referred time-to-digital converters (TDCs) of each channel, associated to a dedicated per-channel control block, a global controller to read the digital time and energy values stored in each channel, represented in FIG. 1, an external clock of frequency up to 160 MHz.

The invention also relates to a readout method for time-of-flight and energy measurements with silicon photomultipliers, illustrated in FIG. 3, which is essentially characterized by measuring the time-stamp of the input pulse using a low threshold, and measuring the energy of the input pulse through the time difference between the two time stamps, where the extraction of the time information is based on two voltage thresholds, used respectively in the pulse raising and falling edges, while the event validation is given by a higher voltage in the second threshold, the time stamps consisting of a coarse 10-bit data latched from the global gray-encoded coarse time counter, and a 8-bit fine time measurement derived from a 50 ps time binning time-to-digital converter, this fine time stamp being a direct measure of the phase of the asynchronous pulse in respect to a chip master clock by using a set of time-to-amplitude converters and a analog-to-digital converter.

DESCRIPTION OF THE READOUT ARCHITECTURE

Prior art in TOFPET systems suffer from two major drawbacks: high power consumption and/or inability to trigger the first photoelectron.

A common feature of prior art designs is the use of a very power consuming front-end amplifier, in order to decrease the input impedance of the said circuit and hence achieve high bandwidth. The invention addresses this issue by using a closed loop current conveyor at the input. This regulated-gate cascode circuit decreases the dissipated power when compared to an open-loop configuration, for the same impedance and noise level at the output. Moreover, the regulation loop is based on a differential amplifier, which allows to fine tune the DC node voltage at the input and thereby to adjust the gain of the SiPM.

SiPMs are also known by their high dark count rate (DCR), in which single pixels randomly fire due to thermal excitation. On the other hand, the signal produced by a dark count of the SiPM is the same as the one we intend to detect, caused by the arrival of the first photoelectron of scintillation due to a detectable event. Some prior art TOF-capable PET systems address this challenge with the use of DLL-based TDCs, able to extract the time information even of these spurious counts, discarding them offline. This has a major impact on the power consumption due to the use of these digital TDCs, where the typical power per channel figure is around 30 mW per channel. This figure is prohibited for very compact systems, as it requires very complex cooling. The power consumption of digital TDCs can be significantly reduced using very deep sub-micron CMOS technology (ex 65 nm and below), which are however very costly. Alternatively, the event rate that arrives to the TDCs is cut by increasing the trigger threshold, thereby losing the ability to discriminate the first photoelectron.

This invention introduces a dual-threshold mechanism. The channel architecture comprises two independent branches with trigger thresholds that can be set separately (cf. FIG. 1). That allows a very low threshold to generate a trigger on the 1st photoelectron, which is used for timing measurements. A higher threshold is then used to validate the pulse, otherwise the event is discarded. This allows in addition to use time-to-digital converters (TDCs) based on analogue time interpolation, which provides good timing accuracy without requiring an implementation in a very deep sub-micron technology.

The inherent lower speed of these TDCs is compensated by using a dual-TDC per channel, to detect independently the timing of the rising and the falling edges of the signal. Since only valid events are readout, the amount of data to be processed by the chip backend is dramatically decreased.

Design of the Dual-Branch Front-End

The choice of the very front-end architecture (FIG. 2) is based on the requirements for low-power (mandatory for highly integrated detectors) and low-impedance (due to the use of devices with terminal capacitance up to 300 pF).

Using a regulated gate cascode input stage as a current conveyor allows to decouple the high input capacitance from the transimpedance transfer function. The regulation loop is implemented with a differential pair with active load. Despite limiting the bandwidth, when compared to a solution with a simple common source, it permits to easily control the input DC baseline. Such feature is of value if one wants to accurately adjust the gain of the SiPM. Moreover, the adjustment of the input impedance becomes independent of both the SNR and the input DC baseline. This trimming is done with a 6-bit current mode DAC. Both hole-collection and electron-collection inputs are available, allowing the choice of different photo-devices. The signal is conveyed into two post-amplifiers with a transimpedance gain up to 4 K$\Omega$, in order to optionally provide a suitable shaped version of the signal for the Time-over-Threshold measurement. Two discriminators, which threshold is defined by independent 6-bit DACs, generate the digital signaling that is fed to the TDCs. The total output rms noise voltage is kept below 5 mV, allowing to lower the threshold Voltage VthT to the level of 0.5 photoelectrons.

The Dual-Threshold Method

Time and energy information extraction is based on a dual time-over-threshold (ToT) scheme (FIG. 3). A low VthT (down to 0.5 p.e.) is used for trigger the first discriminator (on the signal rising edge), while a higher VthE provides event validation on the rising edge of the signal pulse and ToT information on the falling edge of the signal pulse. Each time stamp consists of a coarse 10-bit data, latched from the global gray-encoded coarse time counter, and a 8-bit fine time measurement derived from a 50 ps time binning TDC. This fine time stamp is a direct measure of the phase of the asynchronous pulse in respect to a chip master clock, by using a set of time-to-amplitude converters and an analog-to-digital converter (ADC).

The operation of the two independent TDCs is controlled by a dedicated on-channel control block. Besides managing the analogue switching circuitry, it implements the multi-buffering scheme, interfaces with the global controller and performs event validation. The amplitude of the signal produced by a dark count is of the same order of magnitude of the signal produced by a single photon hit, so the discriminators are set to trigger on every spurious event or not. Three alternative mechanisms for dark pulse rejection were implemented, based on synchronous and asynchronous validation of an higher threshold trigger (energy trigger).

DESCRIPTION OF THE PREFERRED EMBODIMENT

The present invention, described below with a preferred embodiment, refers to a readout apparatus for time-of-flight and energy measurements characterized by using silicon photomultipliers (SiPM), providing accurate time-of-flight information when used in PET systems with fast crystals (e.g. LYSO), which allow to confine the origin of the two 511 keV photons with a position uncertainty of 30 mm along the line-of-response (LOR) and permit unprecedented PET sensitivity.

The preferred embodiment of the readout architecture described is an ASIC made up of 64 channels, bias and calibration blocks and a global controller. One edge is free of pins, such that a twin chip rotated by 180° can be abutted to build a compact 128 channel circuit (cf. FIG. 4). Nominal operation mode uses a 160 MHz clock generated off-chip. Up to two LVDS data output links are available (SDR or DDR), for a total bandwidth from 160 to 640 Mbit/s.

An output clock for synchronous transmission is available, while a TX training mode can also be used to avoid it. Event data is processed on-chip and output in frames with up to 64 events per frame. A raw data mode (safe-mode) is also available, in which event data is output with no arithmetic processing (thereby taking two "slots"). A 10 MHz SPI configuration interface writes and reads the channel configuration, controls calibration procedures and test modes. The clock, reset and coarse time counter is internally propagated by the global controller to each channel, along with the configuration settings.

The invention claimed is:

1. A readout apparatus for time-of-flight and energy measurements in a positron emission tomography (PET) system, the readout apparatus comprising:
   a plurality of silicon photomultipliers (SiPMs), each SiPM supporting a channel selected from a plurality of channels;
   an input front-end condition circuit arrangement per channel, for receiving an input pulse including:

a low impedance input differential amplifier, the low impedance input differential amplifier including a low-noise high bandwidth regulated-gate cascode circuit configured for fine-tuning direct current (DC) input voltage of the input pulse, first and second threshold discriminators, each threshold discriminator having an independently adjustable threshold, each threshold discriminator for receiving input from the low impedance input differential amplifier and providing a corresponding output;

first and a second time-to-digital converters (TDCs) per channel, the first TDC operative to receive input from the first threshold discriminator, the second TDC operative to receive input from the second threshold discriminator, each of the TDCs operative to generate output based on analog time interpolation of the respective received inputs, each of the input front-end circuit arrangement and the TDCs having a power consumption smaller than 10 mW per channel; and a dual-threshold mechanism per channel, for independently setting the thresholds of the first and second threshold discriminators, such that, the first threshold discriminator generates a trigger on the first photo-electron of the input pulse for measuring time when the first threshold discriminator is set to a low threshold, and the second threshold discriminator validates or discards the input pulse when the second threshold discriminator is set to a threshold higher than the threshold of the first threshold discriminator.

2. The readout apparatus of claim 1, wherein a delay line operatively couples the first threshold discriminator to the first TDC, the delay line being long enough to wait for the second TDC to receive the input from the second threshold discriminator, in order to avoid triggering the second TDC by dark counts of the SiPM.

3. The readout apparatus of claim 1, wherein the first and second TDCs are configured to independently measure the timing of the rising and the falling edges of the input pulse, and provide time stamps that include coarse and fine time information, the coarse time information based on a global gray-encoded coarse time 10-bit counter, and the fine time information based on a 8-bit 50 ps time binning.

4. The readout apparatus of claim 1, wherein each TDC includes four time-to-amplitude converters (TAC), an analog-to-digital convertor (ADC), and associated First-In-First-Out (FIFO) multi-buffering.

5. The readout apparatus of claim 1, further comprising a global controller for reading digital time and energy values stored in each channel.

6. The readout apparatus of claim 1, wherein the readout apparatus is implemented as an Application Specific integrated Circuit (ASIC) having up of 64 channels.

7. The readout apparatus of claim 6, wherein one edge of the ASIC is free of pins, such that a rotated twin chip can be abutted to build a compact 128 channel circuit.

8. The readout apparatus of claim 6, wherein a nominal operation uses an external clock of frequency up to 160 MHz.

9. The readout apparatus of claim 6, wherein the ASIC includes two low-voltage differential signaling (LVDS) data output links, such that the ASIC supports a total bandwidth of up to 640 megabits per second (Mbit/s).

10. The readout apparatus of claim 6, wherein the ASIC includes a 10 MHz serial peripheral interface (SPI) configuration for: writing and reading a configuration of each channel of the plurality of channels, and for controlling calibration procedures and test modes of the ASIC.

11. A readout method for time-of-flight and energy measurements using silicon photomultiplier (SiPM) supporting a plurality of channels, the readout method comprising:

front-end conditioning of an input pulse to the SiPM using low impedance input differential amplifiers that include a low-noise high bandwidth regulated-gate cascode circuit and a power consumption smaller than 10 mW per channel, the regulated-gate cascode circuit configured for fine-tuning of direct current (DC) input voltage;

measuring a first time-stamp of the input pulse using a first voltage threshold on a rising edge of the input pulse;

measuring a second time-stamp of the input pulse using a second voltage threshold on a falling edge of the input pulse, the second voltage threshold being higher than the first voltage threshold; and measuring the energy of the input pulse through the time difference of the first and second time-stamps;

wherein the input pulse is validated based on the second voltage threshold, and the time stamps include coarse and fine time measurements, the coarse time measurement including coarse 10-bit data derived from a global gray-encoded coarse time counter, and the fine time measurement including 8-bit data derived from a 50 ps time binning time-to-digital converter, the fine time measurement directly corresponding to a measure of the phase of an asynchronous pulse in a chip master clock by using two independent time-to-digital converters (TDCs), each TDC including a set of time-to-amplitude converters and an analog-to-digital converter.

12. The readout method of claim 11, wherein operation of the two independent TDCs is controlled by a dedicated on-channel control block that manages analogue switching circuitry, implements a multi-buffering scheme, interfaces with a global controller, and performs validation of the input pulse.

* * * * *